(12) United States Patent
Randall et al.

(10) Patent No.: US 8,930,938 B1
(45) Date of Patent: Jan. 6, 2015

(54) MIGRATION TO A SERVICE-ORIENTED ARCHITECTURE

(75) Inventors: Craig Randall, Pleasanton, CA (US); Alex Rankov, Danville, CA (US); Meir Amiel, Pleasanton, CA (US); Victor Spivak, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 1183 days.

(21) Appl. No.: 12/005,062

(22) Filed: Dec. 21, 2007

(51) Int. Cl.
*G06F 9/445* (2006.01)

(52) U.S. Cl.
CPC .................... *G06F 9/44505* (2013.01)
USPC ........................................................... 717/174

(58) Field of Classification Search
CPC ........................................................ G06F 8/06
See application file for complete search history.

(56) References Cited

U.S. PATENT DOCUMENTS

| | | | |
|---|---|---|---|
| 5,907,704 A * | 5/1999 | Gudmundson et al. | 717/100 |
| 6,502,213 B1 * | 12/2002 | Bowman-Amuah | 714/49 |
| 7,711,694 B2 * | 5/2010 | Moore | 707/608 |
| 2004/0119752 A1 * | 6/2004 | Beringer et al. | 345/779 |
| 2005/0138634 A1 * | 6/2005 | Luty et al. | 719/315 |
| 2006/0036687 A1 * | 2/2006 | Wood et al. | 709/204 |
| 2006/0070024 A1 * | 3/2006 | Park | 717/106 |
| 2006/0200477 A1 * | 9/2006 | Barrenechea | 707/100 |
| 2006/0212836 A1 * | 9/2006 | Khushraj et al. | 715/866 |
| 2007/0143474 A1 * | 6/2007 | Sheng et al. | 709/224 |
| 2007/0220115 A1 * | 9/2007 | Srinivasan et al. | 709/219 |
| 2008/0052274 A1 * | 2/2008 | Moore et al. | 707/3 |
| 2008/0133755 A1 * | 6/2008 | Pollack | 709/226 |
| 2008/0270523 A1 * | 10/2008 | Parmar et al. | 709/203 |

* cited by examiner

*Primary Examiner* — Li B Zhen
*Assistant Examiner* — Arshia S Kia
(74) *Attorney, Agent, or Firm* — Van Pelt, Yi & James LLP

(57) ABSTRACT

Migrating a computer-provided solution to a service-oriented architecture is disclosed. One or more primary concerns, each representing a core operation of the computer-provided solution, are identified. One or more secondary concerns, each being associated with a manner in which a core operation of the computer-provided solution is performed, are identified. One or more services, each of which addresses one or more of said one or more primary concerns in a manner determined at least in part by a service context configured to address one or more of said one or more secondary concerns at least in part by indicating as applicable a manner in which applicable ones of said one or more services are to be performed, are defined.

19 Claims, 9 Drawing Sheets

MIGRATION TO A SERVICE-ORIENTED ARCHITECTURE

BACKGROUND OF THE INVENTION

Service-oriented architectures have evolved to make available to service consumers (sometimes referred to herein as "clients") typically via a public, discoverable, and standards-based interface, such as Web Services/SOAP, functionality traditionally provided by procedural and later object-oriented architectures via a tightly defined and often proprietary API. In distributed environments, such as network environments, prior to the development and deployment of service-oriented architecture some computing tasks were performed at clients by rich client-side applications and/or application frameworks, which were communicated with via a typically proprietary API by third party applications or other code running at the client. Such rich client applications and/or frameworks typically interacted with applications or other code executing at the client to determine what tasks the application or code required to be performed, gathered at the client the data required to perform those tasks, and communicated with a remote server on behalf of such application or code in an optimized manner to complete the tasks. In such an environment, the gathering of information to perform tasks and the work required to perform those tasks were completed by invoking procedures, business logic, and/or methods of software objects, as required, all orchestrated by logic at the server side and/or the rich client application and/or framework. Some functionality provided by software developed and written originally as procedural or object-oriented applications have been made available via service-oriented protocols, but typically software owners have merely recast an API conceived for the procedural or object-oriented paradigm as a Web Services or similar interface, which approach can result in inefficiencies, such as multiple round trip network interactions to accomplish a single task, or delays resulting from unresolved dependencies, etc.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Migrating from a non-service-oriented structure and interface, such as a procedural or object-oriented application and associated API, to a service-oriented architecture is disclosed. In some embodiments, the procedural or object-oriented application and/or user (e.g., client application) interactions with same is/are examined to determine a set of "primary concerns" (e.g., core inbound and outbound operations) and a set of "secondary concerns" (e.g., context or other information relevant to the performance of core inbound/outbound operations, affecting for example an aspect of how such inbound/outbound operations are performed). Primary concerns are grouped into related sets of one or more primary concerns. For each group a service and associated interface are defined. For each secondary concern a mechanism is defined to determine how the concern is to be addressed. In some embodiments, a mechanism is defined and made available to service consumers to indicate how each secondary concern is to be addressed. Examples of such mechanism include indicated and default profiles, service request parameters, and filters, as described more fully below.

Figure 1:
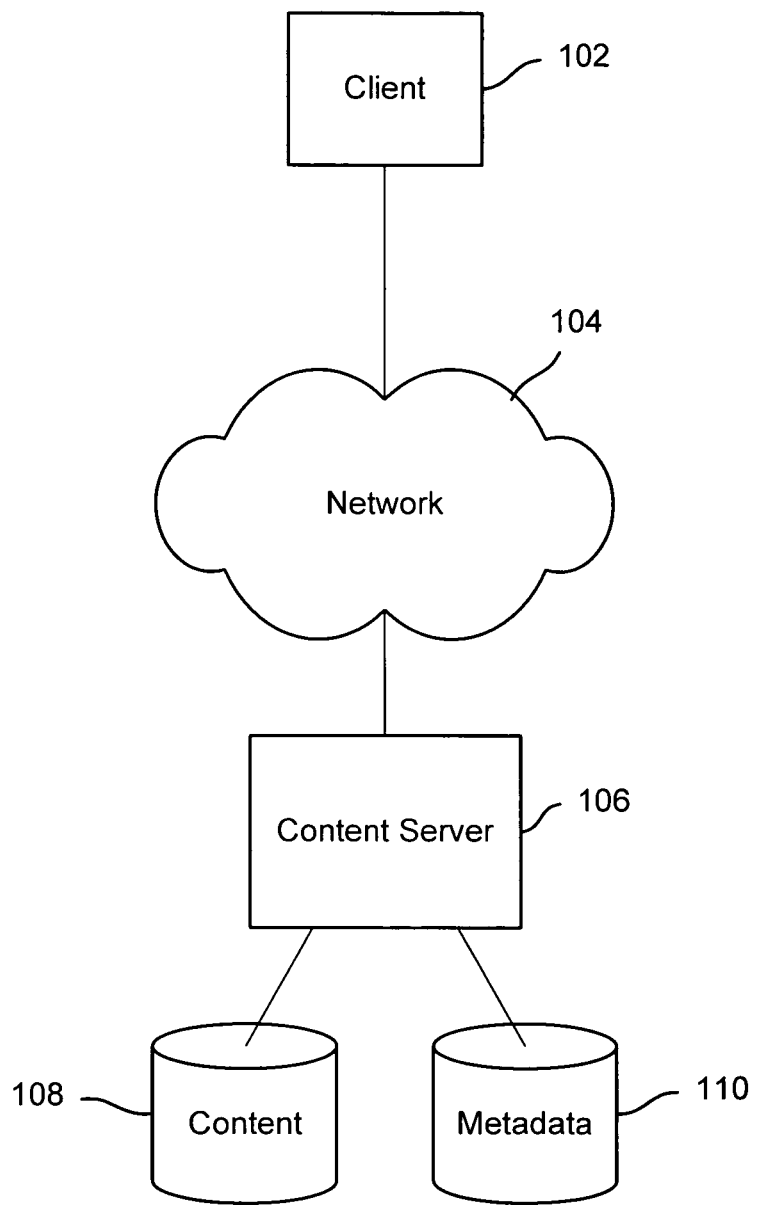
FIG. 1 is a block diagram illustrating an embodiment of a content management system.

FIG. 1 is a block diagram illustrating an embodiment of a content management system. One more clients 102 connect via a network 104 to a content server 106 configured to manage and provide access to body of content stored in a content store 108. For each content item in content store 108, corresponding metadata is stored in a metadata store 110. In some embodiments, each content item in content store 108 is represented in metadata stored in metadata store 110 by one or more objects configured to provide content management related functionality with respect to the content item. Data comprising each metadata object is stored in some embodiments in one or more database table, e.g., in a relational database management system (RDBMS). In some embodiments a content management client on client 102 communicates with content server 106 via network 104 to make content management related services available to applications running on client 102. In some embodiments, client applications on client 102 use a content management framework associated with the content management client to access content management related services. For example, such a client application may be configured to store a new content item (e.g., a document or other object) by invoking the content management client (or the server 106 directly) to create and save a new object, e.g., a new object configured and/or usable to save in content store 108 content data comprising the content item and/or to represent the content item in metadata 110. Similarly, to retrieve data, a client application and/or content management client would communicate with content server 106 via network 104. The client 102 may provide, for example, an identifier associated with a particular content item and/or one or more search criteria, such as a query to search for items created by a particular author on a specified date. In the case of retrieval of a specified content item, the content server 106 would use the provided identifier to retrieve the content item from the content store 108 and provide it to the client 102 via network 104. In the case of a query, the content server 106 would query database 110 to identify responsive objects. In some embodiments, metadata associated with responsive objects is sent via network 104 to client 102 where a user and/or process may select one or more responsive objects for retrieval.

Figure 2:
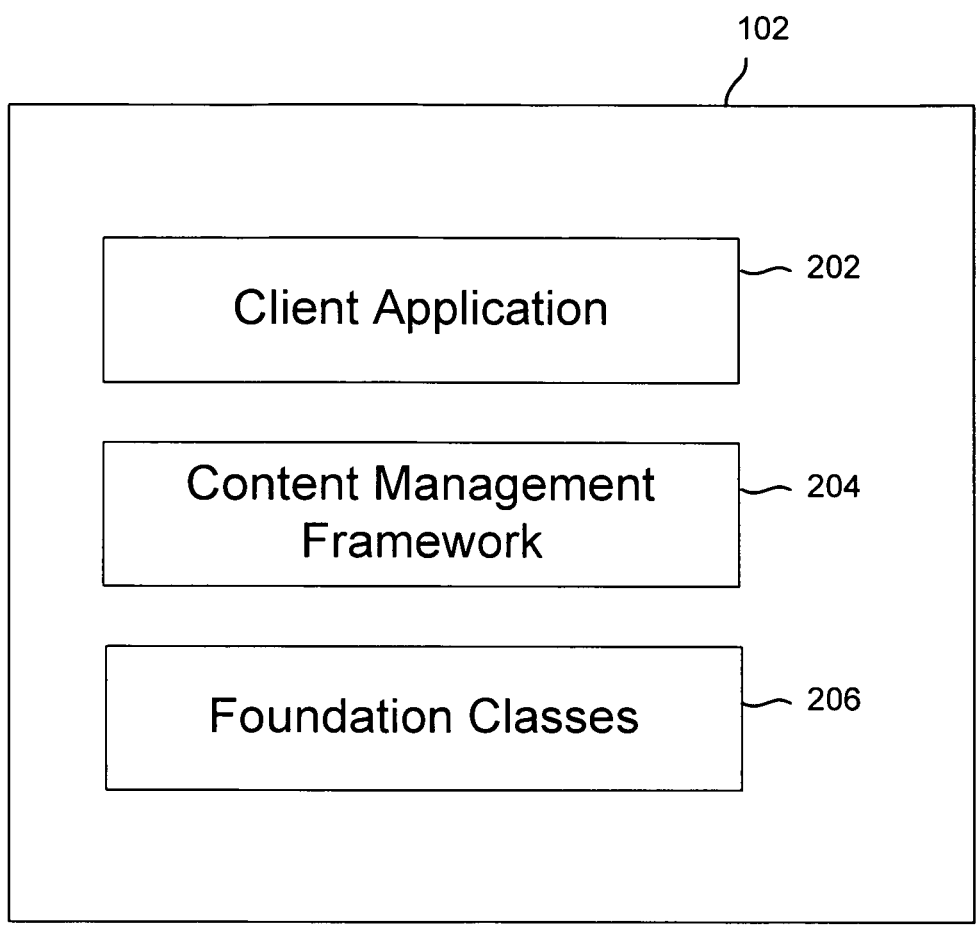
FIG. 2 is a block diagram illustrating an embodiment of a client system.

FIG. 2 is a block diagram illustrating an embodiment of a client system. In the example shown, client 102 includes a client application 202 running on a content management framework 204 that has associated with it a set of foundation classes 206. The client application 202 is configured to invoke methods and components of content management framework 204 to perform content management related operations, e.g., to add a content item to a body of managed content, retrieve and/or modify a previously stored content item, locate content items that satisfy a search query, etc. In some embodiments, to perform certain tasks the content management framework 204 may instantiate objects based on one or more classes comprising foundation classes 206, e.g., to create, populate, and provide to a remote content server an instance of a content object configured to represent in a body of metadata a content item being added to a body of managed content. The framework 204 likewise may be configured to retrieve objects and/or associated content from the remote content server, formulate and send to the server queries and receive, process, and provide query results, etc.

As the example shown in FIG. 2 illustrates, in an object-oriented architecture client applications or other client code may be tightly integrated, via a complex API, with a client side rich application or framework, such as content management framework 204. The client application and client-side framework interact as required to achieve an end result desired by the client application. However, in the typical API multiple interactions may be required to achieve a desired end result. Traditionally each an API exposes separately each outward-facing method, component, or business logic, and each such method, component, or business logic may require data or functionality external to itself to perform a task (i.e., not independent or self-contained) and as a consequence it may be necessary to invoke multiple methods, etc. in succession to achieve a desired end result. For example, retrieval of a most recent version of a content item using a typical object-oriented API may require the following series of interactions between a client application and a content management system (e.g., as accessed via a client-side rich client application and/or framework):

Client: What is the object identifier of the object known by the object name NAME?
Response: "object1"
Client: What is the most recent version of "object1"?
Response: "object1.12"
Client: Retrieve and send to me "object1.12" (.e.g. "Get")
Response: object 1.12 has related objects associated with it, do you want those too?
Client: Yes
Response: here are object 1.12 and its related objects The above example illustrates a typical set of interactions such as may be require to achieve a desired end result via a procedural or object-oriented API, which enables a client to invoke functions and methods that may not be self-contained and/or otherwise not optimized for an environment in which a rich client and/or application framework may not be available at the client. In some embodiments, a sequence of interactions such as those described in the preceding paragraph would be reduced, if possible, to a single service request, with matters such as which version to retrieve and whether related objects should be included in the response being determined by applicable service context data (including potentially assumed, inferred, and/or default context), as described more fully below. For example, a service may be configured to assume that a request to retrieve an object, if no version or other information were included, is intended as a request to retrieve a current version of the object, with related objects if any being included or not as indicated by default and/or user-specified service context data, without further interaction with the service consumer.

Figure 3:
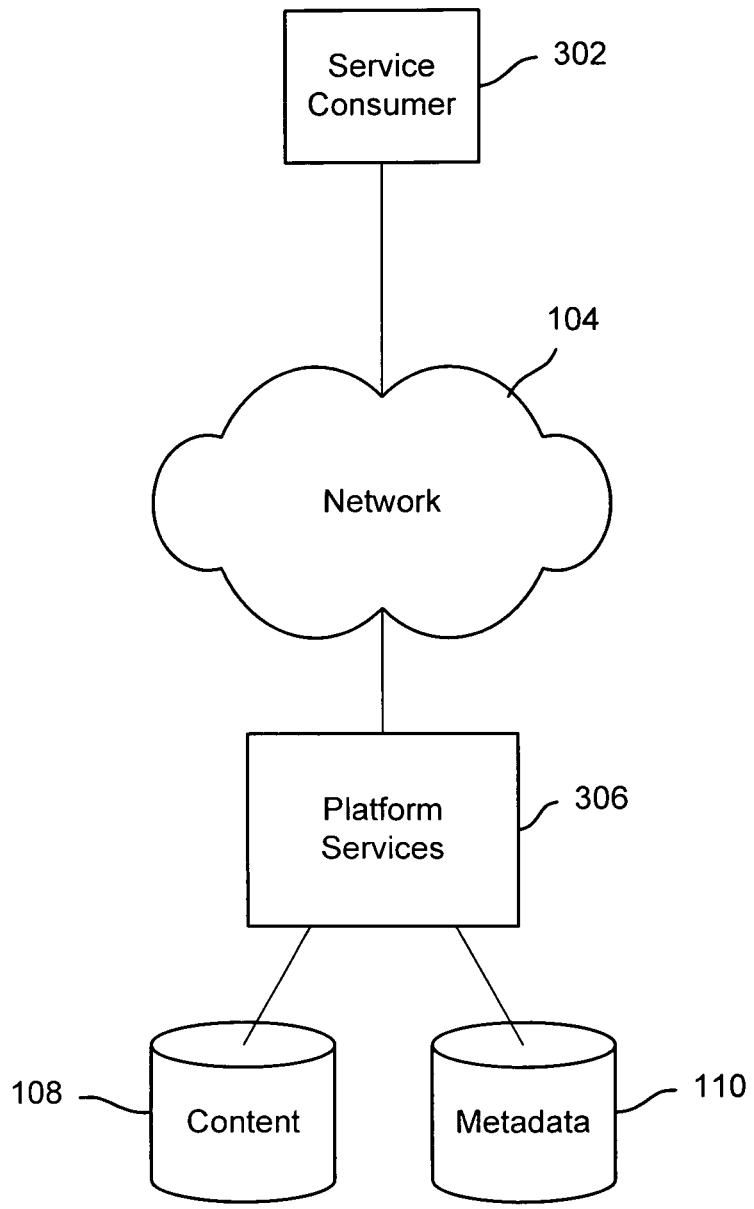
FIG. 3 is a block diagram illustrating an embodiment of a content management system having a service-oriented architecture.

FIG. 3 is a block diagram illustrating an embodiment of a content management system having a service-oriented architecture. In the example shown, a service consumer (client) 302 communicates via network 104 with one or more platform services 306. The platform services 306 manage and provide access to body of content stored in a content store 108. For each content item in content store 108, corresponding metadata is stored in a metadata store 110. In some embodiments, each content item in content store 108 is represented in metadata stored in metadata store 110 by one or more objects configured to provide content management related functionality with respect to the content item. In some embodiments, a service interface or definition of platform services 306 is made available via a registry, not shown in FIG. 3, and may be discovered and used by service consumer 302 to learn how to invoke platform services 306. In such a service-oriented architecture, each service comprising platform services 306 should be self-contained and integrated relatively loosely with other services and/or components. Typically each service has an interface that enables the service to be invoked and a desired and potentially end result achieved, by invoking the service in a single service request. In some cases, such services may be chained to achieve a desired result achievable by performing a sequence of self-contained services in succession.

Figure 4:
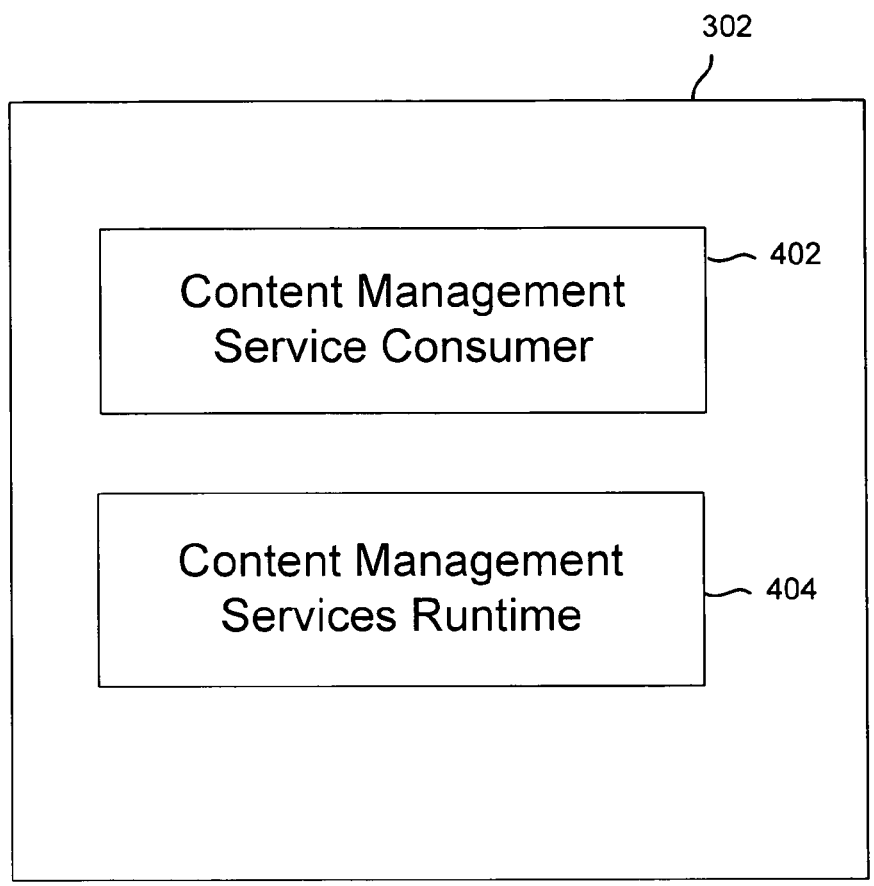
FIG. 4 is a block diagram illustrating an embodiment of a content management service consumer.

FIG. 4 is a block diagram illustrating an embodiment of a content management service consumer. In the example shown, service consumer 302 includes a content management service consumer 402, e.g., a client application or other code that may desire to store, retrieve, or otherwise manage and/or access stored content. The service consumer 402 in this example executes in a content management services runtime environment 404 configured to provide access to content management services residing on a remote server, e.g., platform services 306 of FIG. 3. In other environment, a services runtime may not be included and instead a generic agent, such as a browser, may be used to discover a services definition and invoke the content management services.

Migrating a non-service-oriented API, such as a procedural or object-oriented API, to a service-oriented architecture is disclosed. Primary and secondary concerns are identified. Primary concerns are grouped into services configured to address those concerns. Secondary concerns are addressed as context, e.g., via profiles, request parameters, defaults, filters, etc., within which services addressing primary concerns are performed. In the context of a content management solution, primary concerns include core inbound and/or outbound operations, such adding content to a body of managed content, retrieving content, identifying content items that satisfy specified criteria (e.g., query), searching for content, etc. Secondary concerns in such a setting include how relationships between objects are handled, how virtual "documents" and other complex objects are handled, how multiple renditions of content are handled, etc., in the context of application services.

Figure 5:
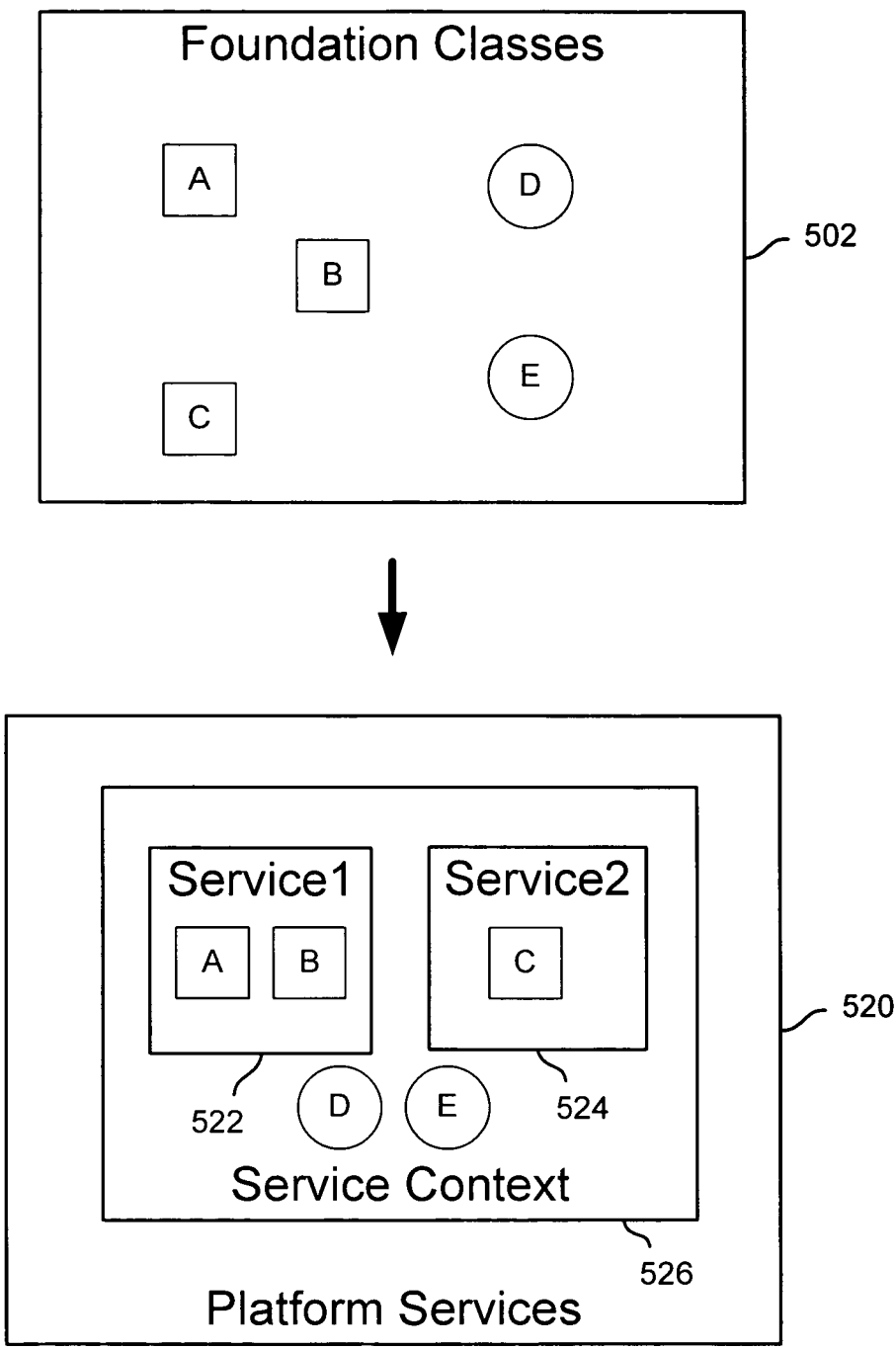
FIG. 5 is a block diagram illustrating an embodiment of a process to migrate a non-service-oriented API to a service-oriented architecture.

FIG. 5 is a block diagram illustrating an embodiment of a process to migrate a non-service-oriented API to a service-oriented architecture. In the example shown, a non-service-oriented set of foundation classes 502 are migrated to a service-oriented architecture and associated interface to define and make available a set of platform services 520. In some embodiments, one or more foundation classes (such as foundation classes 206 of FIG. 2), associated business logic, and/or other code and/or client interactions with same, are studied to determine primary concerns (core inbound and outbound operations) and secondary concerns (requirements and/or preferences as to how inbound and outbound operations are performed) addressed by the foundation classes, business logic, and/or other code; e.g., foundation classes 502 and associated primary concerns "A", "B", and "C", represented by squares, and secondary concerns "D" and "E" represented by circles. Primary concerns that are related (if any) are group, and for each group or individual primary concern a service is defined that addresses the primary concern(s). In the example shown, primary concerns "A" and "B" have been determined to be related and a self-contained service "Service1" 522 has been defined to address those concerns. Similarly, primary concern "C" has been determined to comprise its one group and a second service "Service2" 524 has been defined to address that primary concern. Secondary concerns "D" and "E" are addressed by defining a service context 526 within which the services 522 and 524 are provided. For example, as application the form, content, manner of delivery, etc., of a result returned by service 522 and/or service 524 may be determined at least in part by the service context 526 in which the service is provided, as determined for example by a context variable or parameter included in the service request, a default value, a stored user or other profile, a pre-configured or dynamically defined filter, etc.

Figure 6:
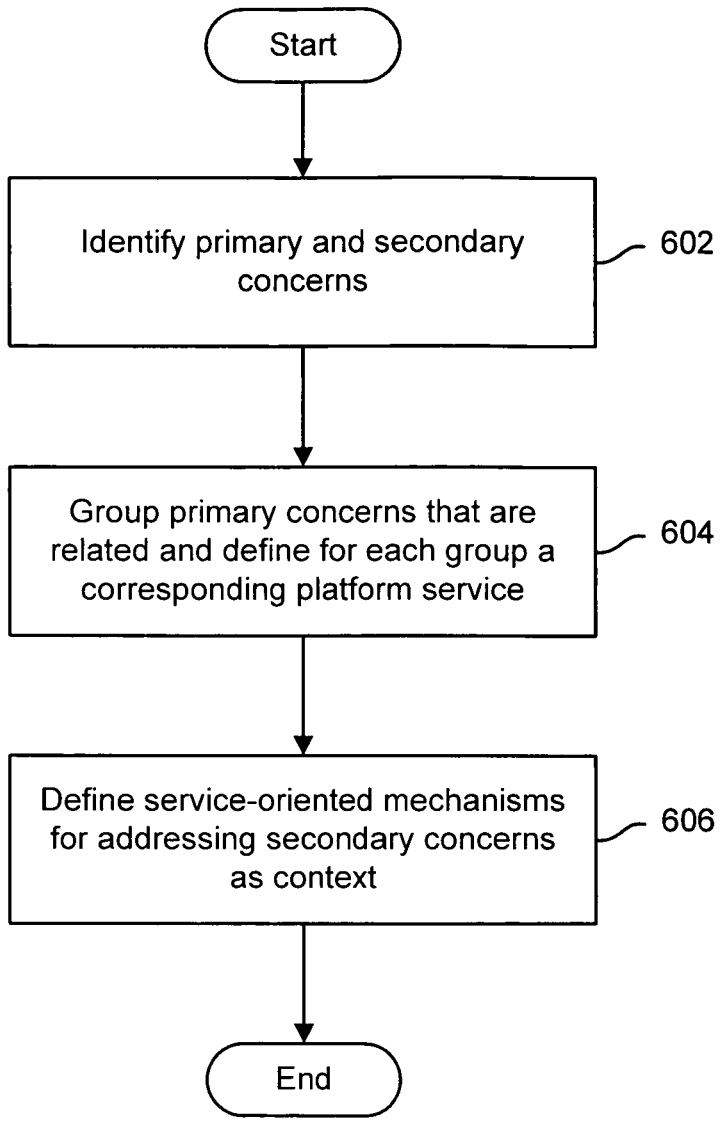
FIG. 6 is a flow chart illustrating an embodiment of a process to migrate a non-service-oriented API to a service-oriented architecture.

FIG. 6 is a flow chart illustrating an embodiment of a process to migrate a non-service-oriented API to a service-oriented architecture. In the example shown, primary and secondary concerns are identified (602). Primary concerns that are related are grouped together, and for each group a corresponding platform service configured to address the corresponding concerns is defined (604). Service-oriented mechanisms to address secondary concerns, potentially across services, as service context are define defined (606).

Figure 7:
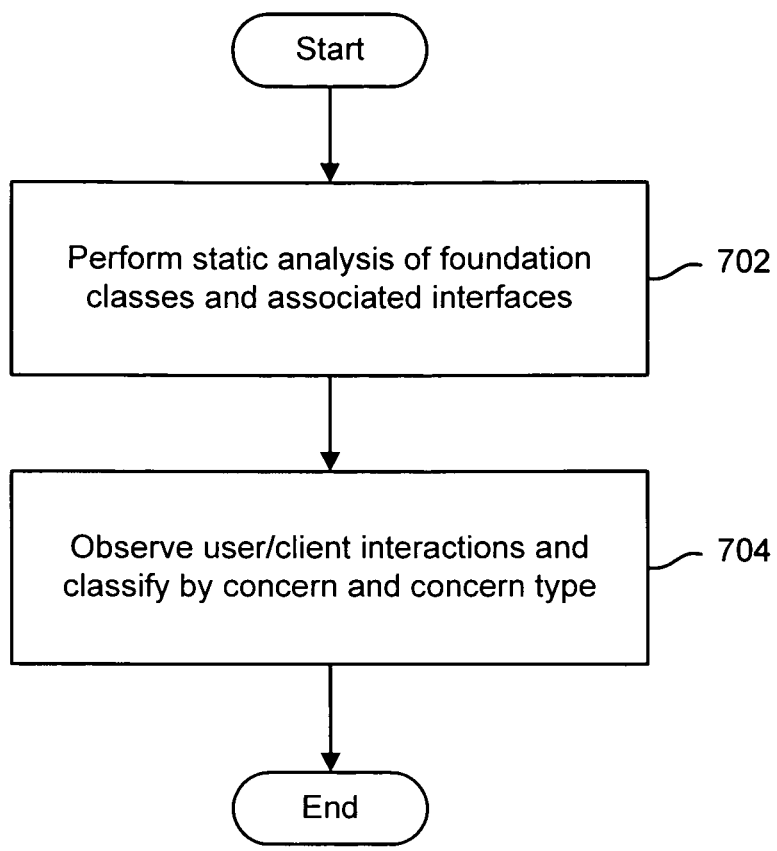
FIG. 7 is a flow chart illustrating an embodiment of a process for identifying primary and secondary concerns.

FIG. 7 is a flow chart illustrating an embodiment of a process for identifying primary and secondary concerns. In some embodiments, the process of FIG. 7 is used to implement step 602 of FIG. 6. In the example shown, a static analysis of foundation classes (and/or business logic and/or other code, as applicable) and associated interfaces (e.g., API) is performed (702). For example, methods, functions, procedures, and interfaces defined to invoke same are analyzed to identify core inbound and outbound operations (primary concerns), such as a request to add, update, or retrieve content in the case of a content management solution, as well as factors that affect how such core inbound and outbound operations are performed (secondary concerns), such as what object attributes are included in an object returned to a requesting client, how related and/or complex objects are handled, whether all and if not which renditions of a content item is/are returned, etc. In addition, in this example user/client interactions with the foundation classes and/or associate code are observed to determine how such users/clients interact with the foundation classes and associated API, such as what context or preference information is solicited and/or provided (secondary concerns) when core inbound and/or outbound operations are performed.

Figure 8:
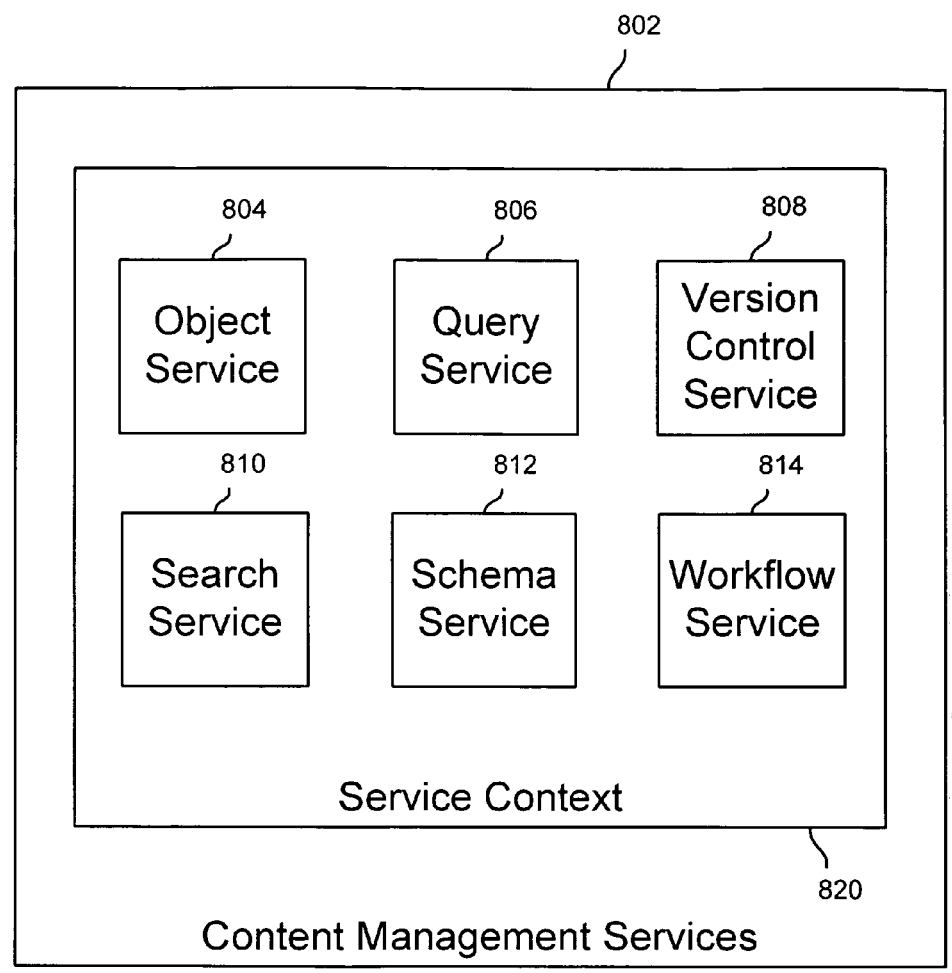
FIG. 8 is a block diagram illustrating an embodiment of a content management solution that has been migrated from a non-service-oriented API to a service-oriented architecture.

FIG. 8 is a block diagram illustrating an embodiment of a content management solution that has been migrated from a non-service-oriented API to a service-oriented architecture. In the example shown, a non-service-oriented content management solution has been migrated to define a set of content management services 802 comprising an object service 804, a query service 806, a version control service 808, a search service 810, a schema service 812, and a workflow service 814 configured to be provided in a service context 820. Each of the services 804-814 addresses one or more primary concerns. Secondary concerns are addressed as applicable by providing services 804-814 in the context of services context 820. In various embodiments, service context 820 comprises profiles, variables, preferences, settings, or other context data that informs the manner in which applicable ones of services 804-814 are provided. In some embodiments, object service 804 provides a set of basic operations on managed content repository objects in cases where a client does not require explicit access to or use of version control functionality. Examples include creating one or more new repository objects, e.g., based on data object instances included in a data package sent in connection with and/or comprising a service request to the object service 804 and retrieving an object (without specifying or needing to specify a version, for example). Examples of service context data potentially applicable to object service 804 include default context, such as the need and desire to transfer content is assumed if a data object includes an indication that content is associated with the object and creating a relationship if a received data object has a relationship object associated and/or included with it. Other context may include profiles that indicate how content should be transferred, if applicable, which properties (attributes) of an object should be provided to the service consumer in response to a request, and whether and/or the extent to which (i.e., how many levels down) related objects should be included. In some embodiments, such profiles may enable a service consumer to obtain additional information about a created object, if required, without making additional requests. For example, relationships may be created and associated identifiers and/or other attributes returned automatically, without further request, in a response to an original service request and/or associated data package that includes a request to create (i.e., add to a content repository) an object included with and/or identified and/or described by the request. In some embodiments, a minimal amount of data is returned as a default, but a profile or other context data or setting can override the default. For example, by default an object identifier of a created object, and no other attribute, may be returned in response to a service request to an object service to create an object; however, a profile may be used to override the default such that further or different information is returned. In some embodiments, object service 804 includes an update operation usable to update a set of repository objects using data supplied in one or more data objects included in a data package associated with a service request to object service 804. In some embodiments an update operation may be applied only to a current version of an object and results in the updated object being saved as a new current version. Updates may include updates to properties (attributes), content, and/or relationships (e.g., to link an object to or unlink an object from a folder). In some embodiments, object service 804 makes available a delete operation (primary concern) which is performed in the context of a delete profile or other context data that indicates how the delete operation should be performed (secondary concerns), e.g., whether subfolders and/or child objects linked to a folder should be deleted if a folder object is deleted; if so how deeply in a hierarchy of objects should the delete operation be extended; whether other objects associated with an object requested explicitly to be deleted, e.g., comprising a virtual document or other complex object should be deleted; and whether other and/or all versions of an object requested to be deleted should be deleted. In some embodiments, query service 806 makes available operations usable to locate an object or set of objects within a repository, for example by searching a body of metadata for records that satisfy a query (e.g., content authored by user X in 2007). Service context (secondary considerations) potentially applicable to query service 806 include profiles indicating how much information (e.g., which attributes/parameters) should be provided about/for each repository object that is responsive to the query, etc. Version control service 808 exposes services associated with storing, managing, and/or accessing different versions of the same object. In some embodiments, version control service 808 is invoke, instead of object service 804, if explicit use and/or fine control of version control mechanisms is required. The service context information applicable to version control service 808 is similar, in some embodiments, to those described above in connection with object service 804. Search service 810 makes available operations to search for content within and/or beyond a managed content repository under direct management by the content management services 802. For example, content repositories managed by other entities and/or typically unmanaged repositories such as desktop PC's or the Internet may be searched and responsive content identified, potentially along with responsive content found in a directly managed repository, if any. Schema service 812 provides access to data about how data is stored in the repository, e.g., a "data dictionary". Finally, workflow service 814 provides operations to access workflow templates used by the content management solution to promote a content item through a workflow (for example, a review/approval chain); to create and launch an instance of a workflow; and/or to check the status or another attribute of an identified instance of a workflow. In some embodiments, the services 804-812 include operations that enable the needs of a content management solution user/client (i.e., service consumer) to be addressed by appropriate requests to one or more of the services (primary concerns) in the context of default and/or user-specified or otherwise determined service context data (secondary concerns).

Figure 9:
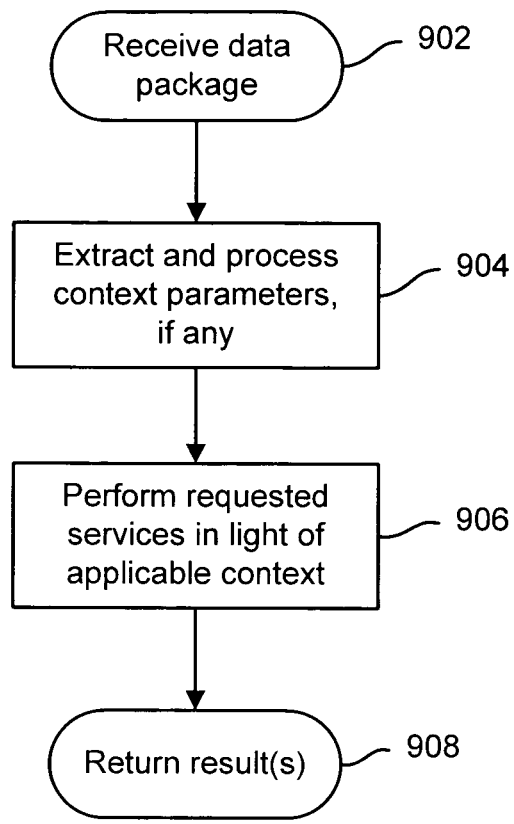
FIG. 9 is a flow chart illustrating an embodiment of a process for providing a content management related service.

FIG. 9 is a flow chart illustrating an embodiment of a process for providing a content management related service. In the example shown, a data package comprising and/or associated with a service request is received (902). Service context parameters, if any, included in the data package are extracted and processed to establish and/or update a service context within which any services requested in and/or in association with the data package are to be performed (904). For example, the data package may include an identifier or other data that indicates a particular profile to be applied and/or used. In some embodiments a default profile may be used, e.g., if no other profile is indicated. The requested service(s) is/are performed in light of the applicable service context, if any (906). A response to the service request is formulated and returned to the requestor (908). In some embodiments, the content, form, manner of sending, etc. of the response is or may be determined at least in part by one or more profiles, filters, and/or other service context data. For example, a content filter may be set to ensure that only pdf renditions of content are delivered.

Using techniques disclosed herein, a non-service-oriented content management solution may be migrated to a service-oriented architecture in a manner that recognizes the advantages and limitations and honors the requirements and expectations of such an environment better than merely using service protocols to project the functions and/or methods of a preexisting (non-service-oriented) procedural and/or object-oriented application and/or interface.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for migrating a computer-provided solution to a service-oriented architecture, comprising:
   identifying a primary concern representing a core operation of a foundation class implementing the computer-provided solution, wherein identifying the primary concern is based at least in part on analyzing a plurality of client interactions between a client application and a content management system associated with the foundation class, wherein the core operation comprises a content management related operation, wherein the content management system comprises a content store and a metadata store;
   identifying a secondary concern associated with a manner in which the core operation of the foundation class has been performed, wherein identifying the secondary concern is based at least in part on analyzing at least a subset of the plurality of client interactions associated with the core operation associated with the primary concern to determine how the client application interacted with the foundation class when the core operation was performed;
   defining a content management service addressing at least the primary concern, wherein the content management service is configured to address the primary concern at least in part by performing the core operation in a service context determined based at least in part on the secondary concern, wherein the defining the content management service includes defining an operation capable of being invoked by a service consumer via a service request to obtain a desired result associated with the core operation in a single service request—service response interaction, wherein the defining the content management service includes reducing two or more pre-migration API calls and responses to a single service request—service response interaction, by defining for at least one or both of the content management service and the service request the service context for the content management service; and receiving the service request associated with the content management service, wherein the service request specifies an identifier usable to determine a metadata object stored at the metadata store that represents a content item stored at the content store on which the operation is to be performed.

2. The method of claim 1, wherein the computer-provided solution comprises a software application.

3. The method of claim 2, wherein the software application comprises a procedural application.

4. The method of claim 2, wherein the software application comprises an object-oriented application.

5. The method of claim 1, wherein said core operation of the computer-provided solution is accessed, prior to migration, via a non-service-oriented application programming interface (API).

6. The method of claim 1, wherein at least one or both of the identifying the primary concern and the identifying the secondary concern comprise analyzing computer code associated with the foundation class of said computer-provided solution.

7. The method of claim 1, wherein at least one or both of the identifying the primary concern and the identifying the secondary concern comprise analyzing an API or other interface associated with the foundation class of said computer-provided solution.

8. The method of claim 1, wherein at least one or both of the identifying the primary concern and the identifying the secondary concern comprise analyzing a third party interaction with the foundation class of said computer-provided solution.

9. The method of claim 1, wherein the computer-provided solution comprises a content management solution.

10. The method of claim 9, wherein the content management solution is configured to manage, store, and provide access to a body of managed content.

11. The method of claim 9, wherein the content management service comprises one or more of an object service, a query service, a version control service, a search service, a schema service, and a workflow service.

12. The method of claim 1, wherein a manner in which the content management service is to be performed is indicated at least in part by one or more of a default context data; a profile; a service request parameter included in the service request; and a filter.

13. The method of claim 1, further comprising receiving the service request, determining the applicable service context based on the secondary concern, and performing the service request at least in part according to the determined service context.

14. The method of claim 1, wherein:
the foundation class comprises a plurality of foundation classes each including a respective primary concern, and
the content management service includes the respective primary concerns from each of the foundation classes.

15. The method of claim 1, wherein:
the foundation class comprises a plurality of foundation classes each including a respective secondary concern, and
the content management service includes the respective secondary concerns from each of the foundation classes.

16. The method of claim 1, wherein:
the foundation class comprises a plurality of foundation classes each including a respective primary concern, and
the content management service comprises a plurality of services each including the respective primary concerns from each of the foundation classes.

17. The method of claim 1, wherein:
the foundation class comprises a plurality of foundation classes each including a respective secondary concern, and
the content management service comprises a plurality of content management services each including the respective secondary concerns from each of the foundation classes.

18. The method of claim 1, wherein analyzing the at least subset of the plurality of client interactions associated with the core operation to determine how the client application interacted with the foundation class when the core operation was performed includes observing one or more of the following: which one or more object attributes are included in an object returned to a requesting client, how a related object is handled, how a complex object is handled, and whether at least some renditions of the content item are returned.

19. The method of claim 1, wherein the primary concern comprises a first primary concern, the core operation comprises a first core operation, and wherein defining the content management service includes:
determining that the first primary concern and a second primary concern are related, wherein the second primary concern is associated with a second core operation;
including the first primary concern and the second primary concern in a group; and
defining the content management service to address the group including the first primary concern and the second primary concern, wherein the service is configured to address the group at least in part by performing the first core operation and the second core operation.

* * * * *